United States Patent [19]

Auger et al.

[11] Patent Number: 4,885,727
[45] Date of Patent: Dec. 5, 1989

[54] AUTOMATIC RESETTING OF SEISMIC WATER SOUND SOURCE

[75] Inventors: David Auger, Hayes; Jacobus Breugelmans, Biggin Hill, both of England

[73] Assignee: Seismograph Service (England) Limited, Great Britain

[21] Appl. No.: 36,198

[22] Filed: Apr. 8, 1987

Related U.S. Application Data

[63] Continuation of Ser. No. 691,495, Jan. 14, 1985, abandoned.

[30] Foreign Application Priority Data

Jan. 17, 1984 [GB] United Kingdom ............... 8401171
Aug. 17, 1984 [GB] United Kingdom ............... 8420907

[51] Int. Cl.$^4$ ........................... G01V 1/14; G01V 1/38
[52] U.S. Cl. ........................................ 367/146; 181/120
[58] Field of Search ................. 124/70, 73, 75; 181/113, 115, 117, 118, 119, 120; 367/141, 143, 144, 145, 146

[56] References Cited

U.S. PATENT DOCUMENTS

| 3,394,775 | 7/1968 | Ude et al. ............... 367/143 X |
| 3,403,374 | 9/1968 | Mellen et al. ............ 367/143 |
| 4,131,178 | 12/1978 | Bouyoucos ............... 181/120 |
| 4,185,714 | 1/1980 | Pascouet et al. .......... 181/120 |
| 4,196,788 | 4/1980 | Sciard .................. 181/120 |
| 4,234,052 | 11/1980 | Chelminski .............. 181/120 |
| 4,240,518 | 12/1980 | Chelminski .............. 367/144 |
| 4,252,210 | 2/1981 | Sodich .................. 181/120 |
| 4,253,539 | 3/1981 | Magneville ............ 367/146 X |
| 4,303,141 | 12/1981 | Pascouet ............... 367/146 X |
| 4,334,592 | 6/1982 | Fair .................... 367/143 |
| 4,594,697 | 6/1986 | Pascouet ............... 181/120 X |
| 4,603,409 | 7/1986 | Jaworski ................. 367/146 |

OTHER PUBLICATIONS

Hydropneumatic Water Guns, Seismic Systems, Inc., Advertisement 1983.

Primary Examiner—Brian S. Steinberger
Attorney, Agent, or Firm—Mason, Kolehmainen, Rathburn & Wyss

[57] ABSTRACT

An automatic resetting apparatus for a water sound-source which apparatus includes a source of high pressure resetting liquid, conduit means for connecting the source to the sound-source, a valve in the conduit means, which valve is, in use, under the direct or indirect influence of an actuating pressure of a sound source charging fluid, is actuable from a first position to a second position at a predetermined low actuating pressure within the charging fluid and will remain in said second position until the pressure within the charging fluid falls to said predetermined low pressure, whereupon the valve returns to the first position, the second position allowing the resetting liquid to pass along the conduit means to reset the sound-source and the first position allowing discharge of the resetting liquid from the sound-source after the sound-source has been reset.

13 Claims, 9 Drawing Sheets

AUTOMATIC RESETTING OF SEISMIC WATER SOUND SOURCE

This application is a continuation of application Ser. No. 691,495, filed January 14, 1985, now abandoned.

This invention relates to a resetting system for a sound-source for use in seismic surveying, more particularly to an automatic resetting system for a water sound-source for use in seismic surveying.

Water sound sources (e.g. water guns) are widely used to generate sound under water for use in seismic surveying. One such water gun is disclosed in British published patent application No. 2075677A and produces a seismic pulse by expelling a volume of water at such a velocity that the water overshoots, and creates a cavity which then implodes. The gun disclosed in the above application discloses a complex hydraulic resetting system for the gun.

Specifically, the system disclosed therein necessitates the use of the oil-hydraulic powerpack with transfer barriers to transmit the energy contained in the oil to water which is used to reset the gun.

The water used for re-sealing and re-cocking of the water sound-source has to be pumped back by the sound-source itself, but because of the construction of the sound-source the maximum speed of the water on its return to the ship is limited due to the hydraulic disadvantage reducing available pressure from e.g. 2000 p.s.i. to 275-290 p.s.i. and due to the great length of the hose between water sound-source and ship.

The energy loss is made worse by the fact that there is always some expansion in a flexible hose and also that the reversal of the flow causes erosion inside the hose which increases the flow-resistance.

There has also been suggested a pneumatic resetting system for a water gun which system employs an air distributor.

In both of these known systems "autopopping" can occur, a hunting phenomenon due to the required pressure differentials within the sound source not being achieved.

The present invention has as an object the provision of a resetting system which obviates or alleviates the disadvantages of known resetting systems.

According to the present invention there is provided an automatic resetting apparatus for a water sound source which apparatus includes a source of high pressure resetting liquid, conduit means for connecting the source to the sound source, a valve in the conduit means, which valve is, in use, under the direct or indirect influence of an actuating pressure of a sound source charging fluid, is actuable from a first position to a second position at a predetermined low actuating pressure within the charging fluid and will remain in said second position until the pressure within the charging fluid falls to said predetermined low pressure, whereupon the valve returns to the first position, the second position allowing the resetting liquid to pass along the conduit means to reset the sound source and the first position allowing discharge of the resetting liquid from the sound source after the sound source has been reset.

Very preferably the high pressure resetting liquid is seawater since this is plentiful and without environmental risk. It is possible however to use other high pressure resetting liquids such as oil, fresh water or high water based liquids. The sound source charging fluid is generally the high pressure fluid used to charge the water gun itself. Preferably this fluid is high pressure air.

The sound source could be of the pneumatic type but is preferably of the water gun type since air guns are inefficient and "noisy", i.e. have a bad signal-to-noise ratio.

In one embodiment the valve includes a piston having a surface of relatively large surface area upon which the actuating pressure derived from the high pressure charging fluid can act and moves under the influence of the actuating pressure against the action of a spring or the like to move a spool provided within the valve to control the flow of high pressure resetting liquid. Means are provided, preferably in the form of a stop in the path of the piston, so that any over-pressure will not affect the spool location. More significantly the spring pressure is selected such that the spool will be moved at a relatively low actuating pressure of the charging fluid and will stay in its moved position whilst the pressure of the charging fluid increases and until the actuating pressure once more falls below that of the spring.

Accumulators are preferably provided in the conduit means for the high pressure resetting liquid thereby to reduce transient shock-loading upon valve operation and to increase the supply of resetting liquid when the sound-source is being reset. They also enable a pump supplying the high pressure resetting liquid to be loaded more evenly. By locating a said accumulator near the valve, flow-resistance in the conduit between the source of the resetting liquid and the valve is reduced.

The phenomenon of autopopping referred to above is essentially caused by not achieving a sufficient difference in pressure between the gun-actuating pressure and that acting directly or indirectly upon the valve.

When initially setting the gun ready for firing it may be necessary to externally regulate the pressure applied to the valve because the required pressure differential may not be available. This may be achieved by providing a control valve in a vent line for the said charging fluid thereby to prevent the pressure applied to the valve from falling until the necessary pressure differential is obtained. The control valve may be pneumatically, manually or hydraulically operated, preferably at a distance from the sound-source, e.g. upon the deck of the control ship.

Alternatively valve means may be placed in the supply line of the high pressure charging fluid to the valve of the present invention to permit unrestricted flow of the said charging fluid to the valve but to restrict flow of the said charging fluid from the valve, once again to ensure that the valve remains open long enough that the required pressure differentials within the gun are achieved.

An automatic resetting system as described above works well but may use a considerable quantity of the charging fluid, e.g. the high pressure air. In fact, it has been found that almost as much air may be used to actuate the valve as is used per shot by the sound source itself.

It is therefore another object of the present invention to reduce the quantity of charging fluid consumed and to increase the resetting speed of the system.

According to a preferred feature of the present invention there is provided an automatic resetting system as defined hereinbefore, wherein actuating valve means are provided to actuate said valve, said actuating valve means being directly or indirectly under the influence of an actuating pressure of a said sound source-charging fluid to control the passage of a valve-actuating fluid to and from the valve, and said actuating valve means being adapted to actuate the valve from said first position to said second position at said predetermined low actuating pressure within the charging fluid and to cause the valve to remain in said second position until the pressure within charging fluid fall to said predetermined low pressure thereupon to move said valve back to said first position.

The valve actuating fluid is preferably either high pressure sea water or high pressure air.

Embodiments of the present invention will now be described by way of example only, by reference to the accompanying drawings, in which.

Referring to FIGS. 1 to 4 of the drawings, a water sound source 1 includes a shuttle 3 possessing various surfaces to which pressure can be applied, and a sleeve 2 also having surfaces to which pressure can be applied and adapted to cooperate with the shuttle 3. The working of the water sound-source will not be described in detail since it is generally similar to that disclosed in British published patent application Ser. No. 2075677A. The contents of that application are herein incorporated by reference. It will be seen however that in an initial position (FIG. 1) the sleeve 2 abuts a seal 6 on shuttle 3 with the result that pressurized air acts to urge the shuttle 3 into contact with sleeve 2 by means of a pressure differential across the respective surfaces of shuttle 3. When a solenoid valve 4 is actuated the connection between sleeve 2 and seal 6 is broken, the air pressure acts upon a much greater surface area of the shuttle 3 and hence accelerates it rapidly thereby expelling the volume of water at high velocity through apertures 8, provided at one end of the source 1.

Valve 12 is a non-return valve which allows pressure to be maintained in the system once accumulators 10 and 11 have been charged up and allows pump 14 to be off-located via valve 13, so that it will require only minimum power between shots; this being especially important for longer intervals between shots.

The resetting system of the present invention as embodied in the above mentioned figures will now be described in detail, employing sea water as the resetting fluid.

A conduit 7 in sleeve 2 is arranged to communicate with the high pressure air (2000 p.s.i.) in the sound-source after the seal connection referred to above has been broken. High pressure air passes along the conduit and actuates a hydraulic valve 9, thereby to admit seawater under pressure into an annular region formed between the sleeve 2 and the housing of the sound-source. The effect of this admission of sea water under pressure is to drive the sleeve 2 along the sound-source and once again into contact with the shuttle 3. As shuttle 3 and sleeve 2 once more make contact a valve 5 is opened to vent the high pressure air from within the sound-source which was used to actuate the hydraulic valve 9. It is to be noted that the sealing connection between sleeve 2 and shuttle 3 is once again made.

The hydraulic valve 9 is such that it will be actuated and remain in its actuated state under a pressure of greater than 50 p.s.i. until the air pressure falls to less than the predetermined value i.e. 50 p.s.i., whereupon biassing spring means within the valve urge a valve spool to its original position, in which original position seawater from the said annular chamber is vented into the sea.

With the pressure of the seawater in the said source dwindling, the air pressure acting upon respective outer annular surfaces of the sleeve is now sufficient to cause the sleeve/shuttle combination to move back to its original "firing" position.

For initial setting up the following problems exist:
1. The sound-sources should preferably not be pressurised on deck above 100–150 p.s.i., to minimise risk to personnel and equipment.
2. We have to get rid of air from the hydraulic fluid used to reseal the sound-source;
3. The sound-source has to be brought up to full shooting pressure once it has entered the water.

Unless the pressure inside the sound-source is many e.g. 20×, times the pressure in the annular space between shuttle and sleeve, the shuttle and sleeve will not be held together. But, as soon as the 50 p.s.i. lower limit of the hydraulic valve is reached, the operating chamber will be pressurized hydraulically by this valve so some hunting will occur; for as soon as the sleeve meets the shuttle, air will be released from the annular space between sleeve and shuttle, the air which operated the hydraulic valve will go down in pressure and the operating chamber will be connected to the sea again releasing the hydraulic pressure on the sleeve, so sleeve and shuttle will try to separate again for the abovementioned reason.

If there is air, (i.e. bubbles/cavities) in the hydraulic fluid (as there will be initially) this may damage the sound-source if it "auto-pops". (It has already been found that pneumatically operated sound-sources get damaged more easily than hydraulically operated ones).

Once the sound-source is in the water the only controls which exist are of air-pressure, firing control and hydraulic pressure.

Figure 1:
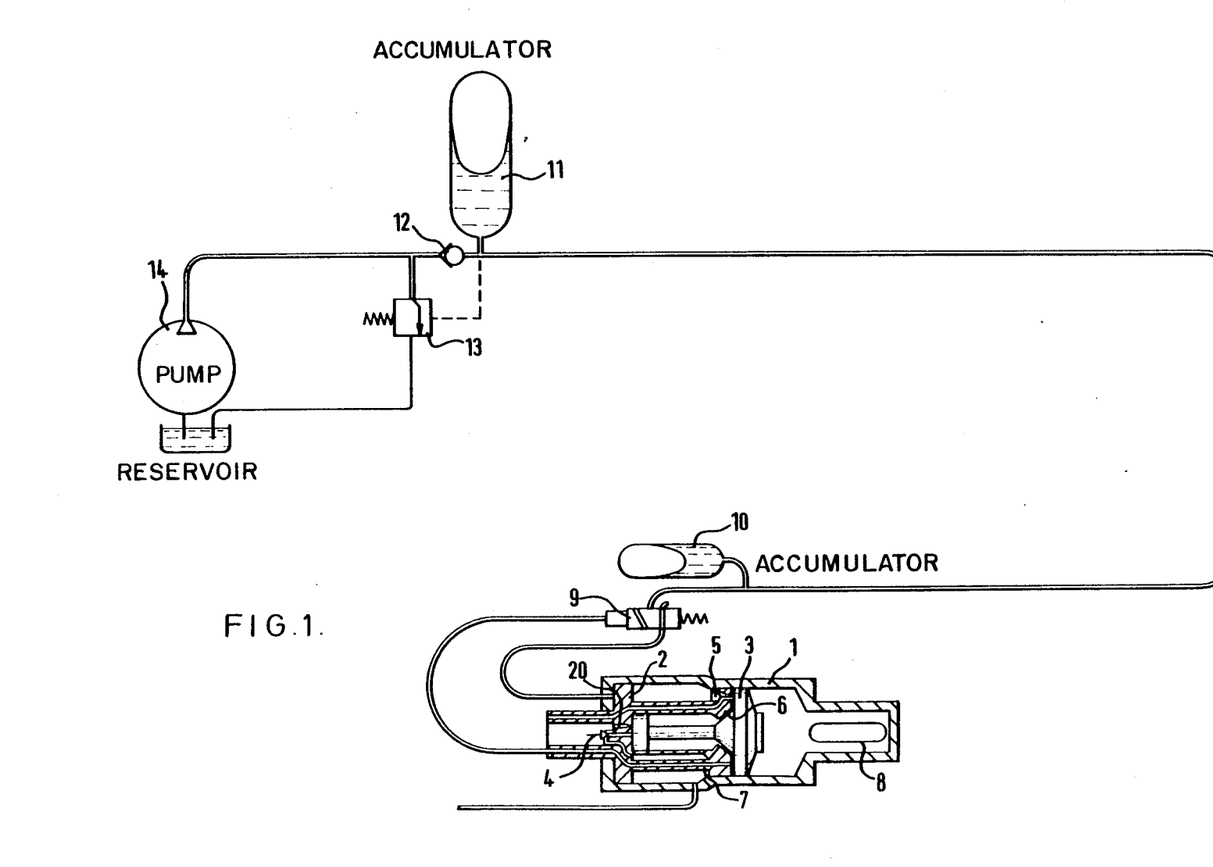
FIGS. 1 to 4 show diagrammatic axial sections of a water gun and an embodiment of a resetting system according to the present invention, at different stages of operation.
Figure 2:
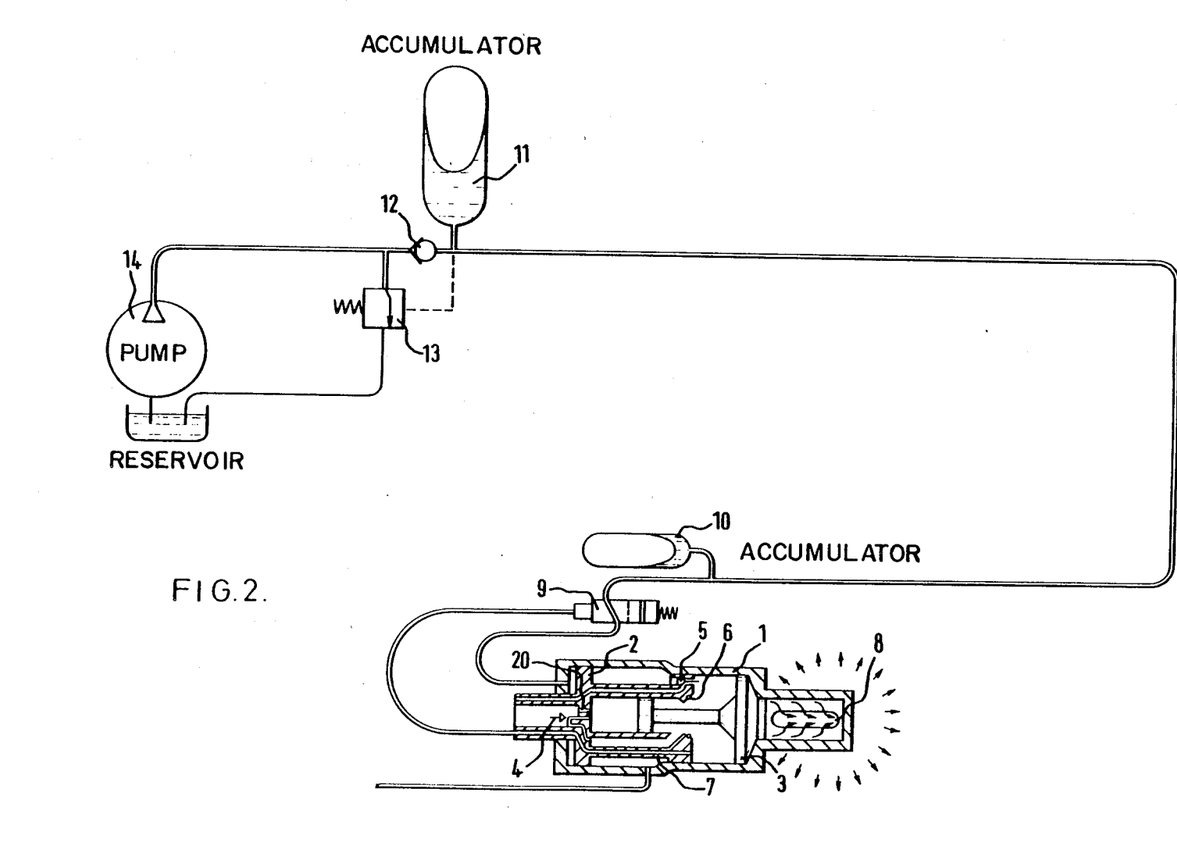
Figure 3:
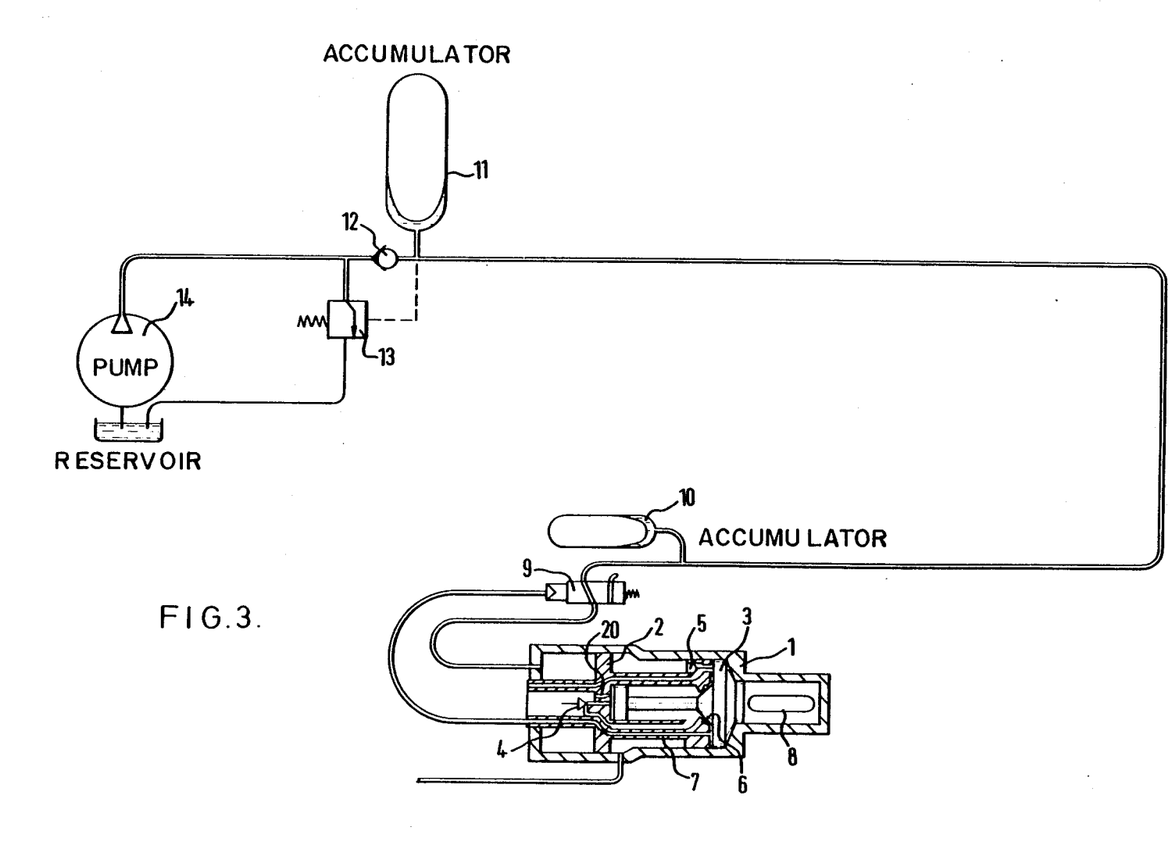
Figure 4:
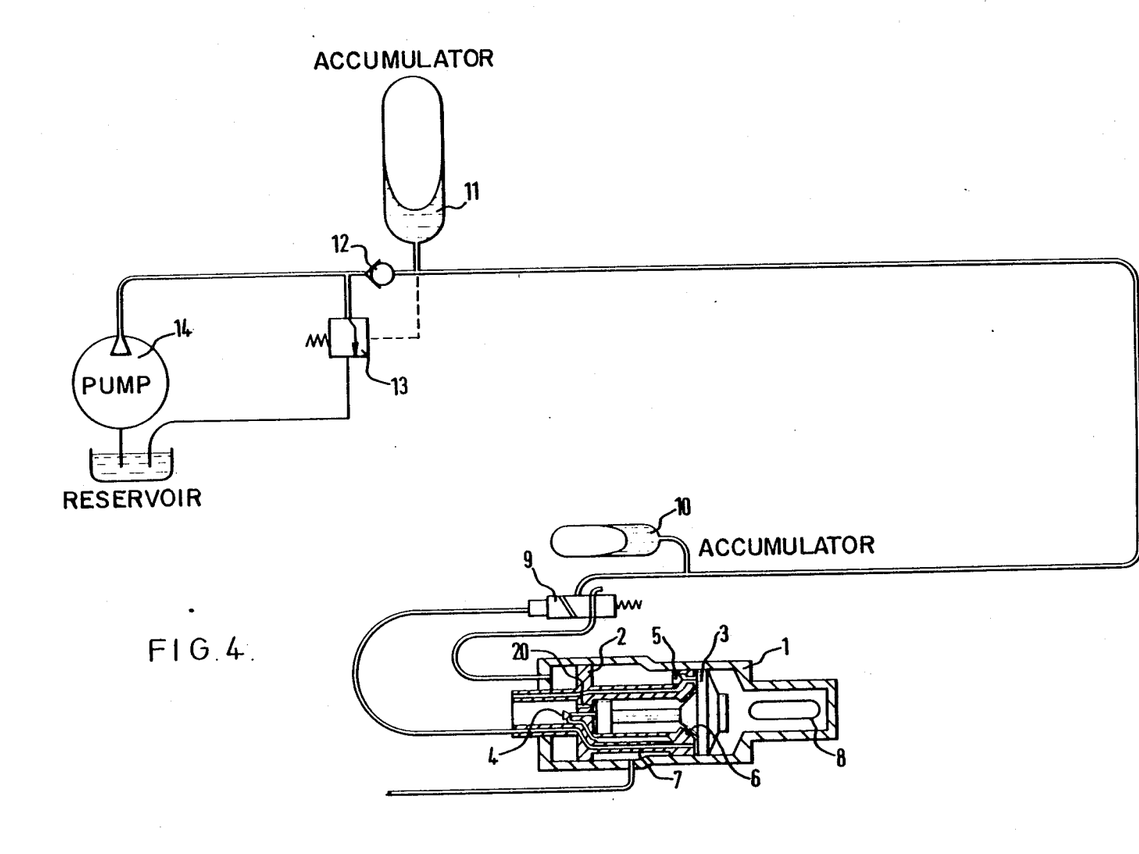
Figure 5:
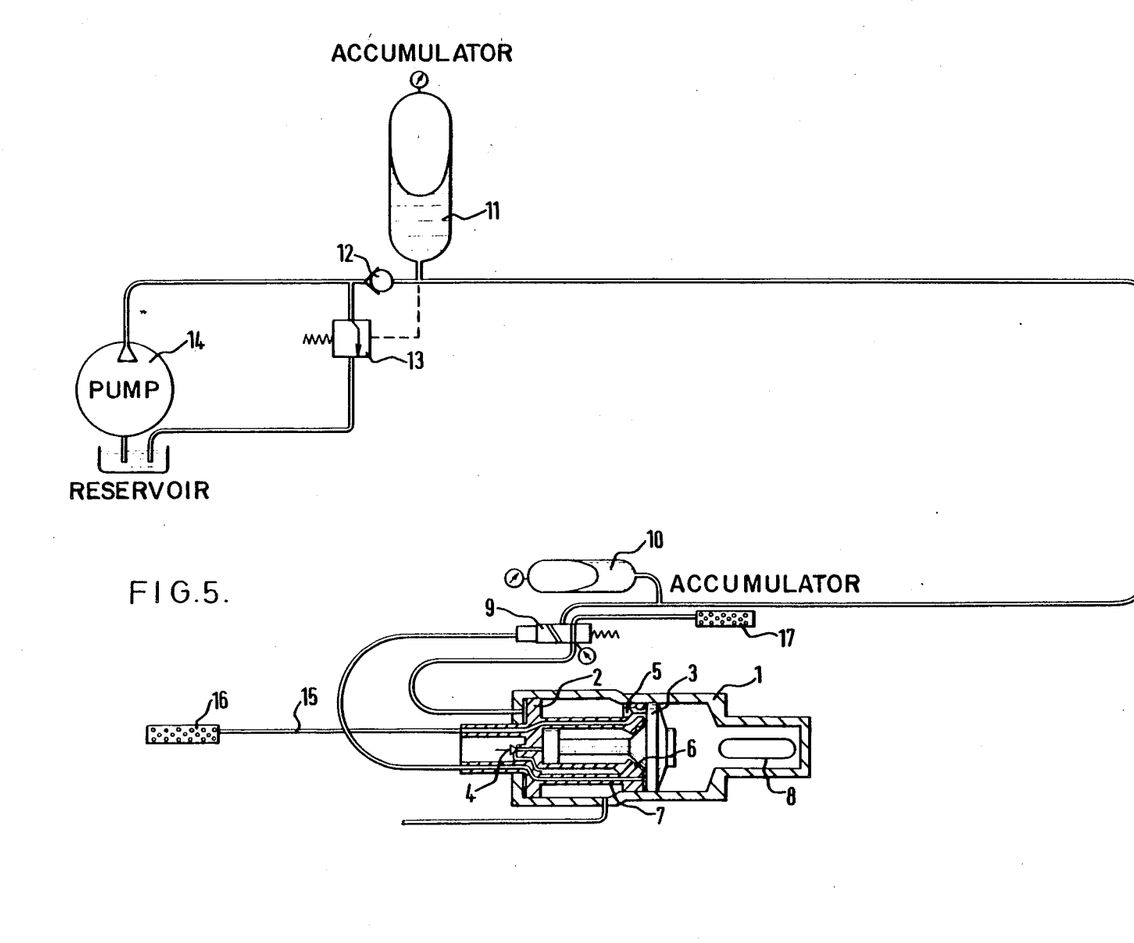
FIG. 5 shows an alternative embodiment.

These problems can be overcome by the addition of a simple on-off valve controlling the bleed-off from the annular space between shuttle and sleeve, i.e. the sound source can be pressurized to 50 p.s.i. and the operating chamber can be filled with and be kept filled as long as the bleed-off valve is closed. Once the sound-source has been lowered into the water the firing chamber can be pressurized to say, 1000 p.s.i. and by then operating the bleed-off valve the annular space between shuttle and sleeve can be de-pressurized, the hydraulic valve releases the hydraulic fluid from the operating chamber and the sound-source can re-set itself. Such a valve is shown in FIG. 5 identified as 15.

As an additional benefit the air expelled from the annular space between shuttle and sleeve can now be expelled well away from the sound-source and even above the water-level (e.g. attached to a buoy or umbilical) so no unwanted noise is produced under water. Diffusers 16 and 17 may be provided to reduce further the noise generated by venting the air and seawater into the sea.

As for the location of this control valve 15, it could be, say ten or twenty feet away from the sound-source towards the ship or, as only small bore hose is required, far enough to stay on board even when the sound-source is deployed, although this makes the umbilical somewhat more bulky. As long as the valve 15 is far enough away from the sound-source to lower it into the water before releasing the hydraulic pressure required for resealing it, it would make the system safe.

Figure 6:
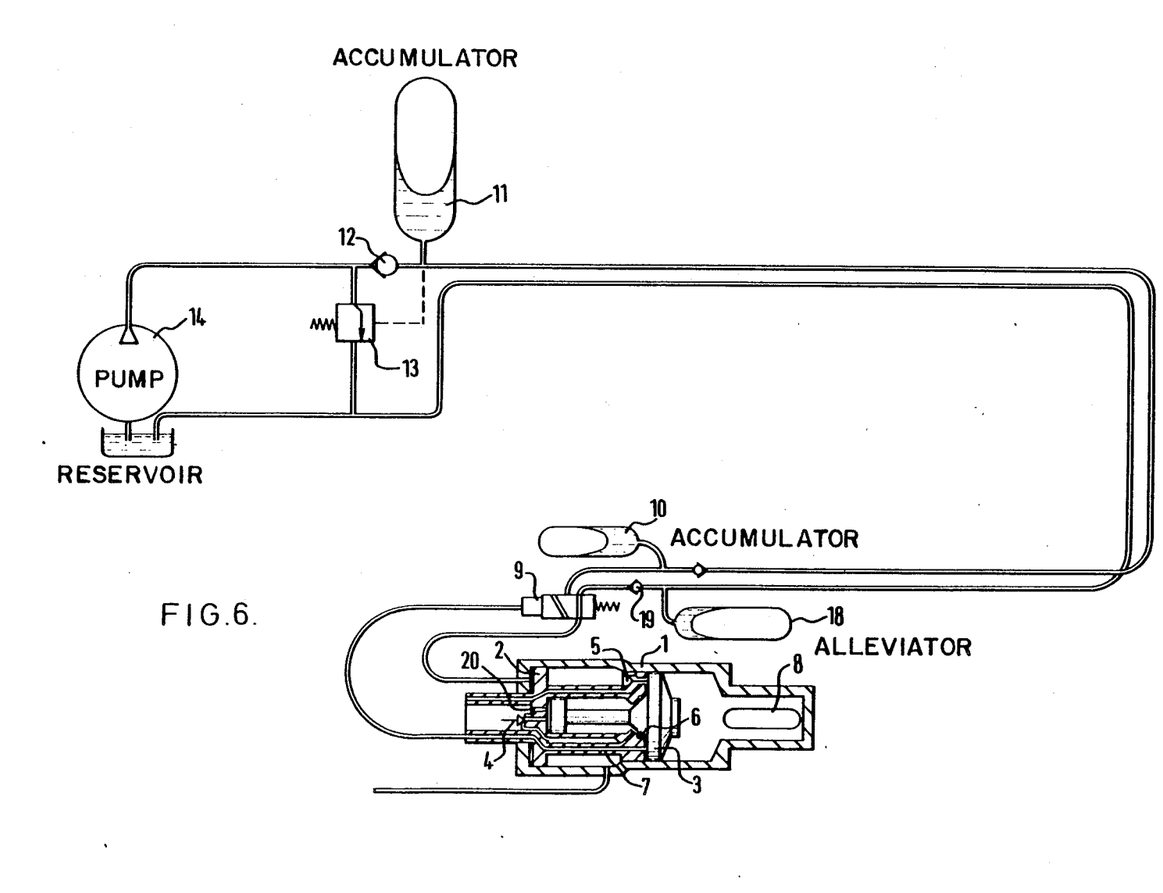
FIG. 6 shows an alternative embodiment.

In the embodiments of FIGS. 1 to 5, seawater was employed as the resetting liquid and this was allowed to discharge into the sea after resetting had occurred. FIG. 6 shows an alternative system in which the resetting liquid (which need not be seawater but could be for example oil, or high water based liquid) is recycled from the sound-source and valve after use back to the pump 14. Accumulator 10 is employed to prevent shock-loading; the accumulator 11 is present to achieve faster supply of the resetting liquid at high pressure. Additionally, an alleviator 18 and check valve 19 may be provided in the low pressure discharge line for the seawater to ensure that the seawater is discharged rapidly and with little flow resistance.

As it is possible for water to enter the space above the small piston of the shuttle through a small venting orifice 20 which allows air to escape from this space, this can cause the sound-source to malfunction. A small check-valve or flap-wave may therefore be provided to prevent water entering this space and only allow the air, used for firing the sound-source, to escape.

It is of course useful to be able to have the lowest possible pressures involved in firing the gun, which are compatible with efficient working. One constraint on achieving a less high air pressure is that the air pressure in the annular space between sleeve and shuttle has to drop to a certain level before the actuator in the hydraulic valve switches back again under influence of its return spring.

The problem is that the area of the sleeve on which the air-pressure in the annular space works is so much larger than the differential area between the top piston of the shuttle and its seal at the base, that this air-pressure has generally to drop to, say, 1/20 of the pressure inside the sound-source (depending on where the seal makes contact). Therefore, if the lowest pressure at which the actuator of the hydraulic valve still holds, is 50 p.s.i. the pressure inside the sound-source has to be approximately 1000 p.s.i. to avoid auto-popping.

When it is planned to use the sound-source at a working pressure of 2000 p.s.i. The valve of 50 p.s.i. is suitable.

Figures 7, 8:
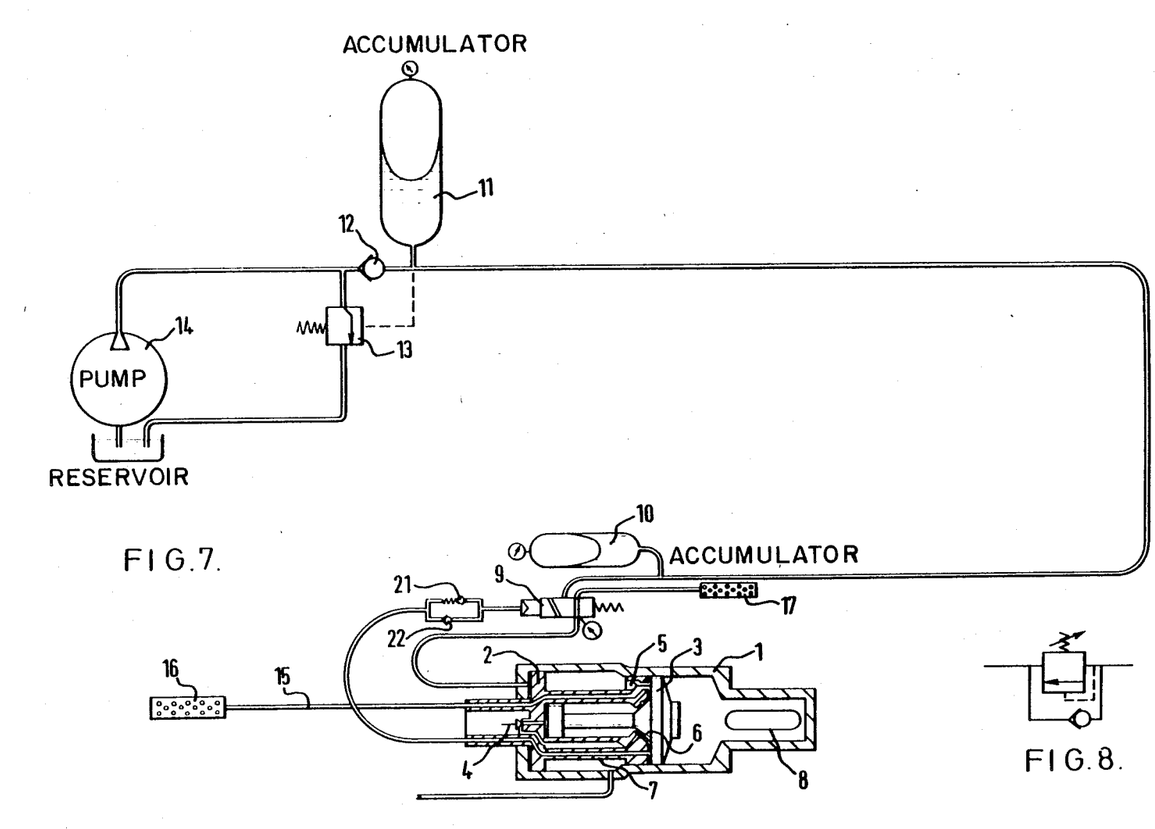
FIG. 7 shows a further embodiment incorporating non-return valves.
FIG. 8 is a diagram of a valve which could replace the non-return valves of FIG. 6.

It would, however be very useful if the gun could be operated at a much lower pressure than 2000 p.s.i. FIG. 7 shows a method to achieve this.

By feeding the pneumatic actuator of the hydraulic valve via a system of two non-return valves 21 and 22, one opening towards the actuator without restriction and one which opens on the return from the actuator with a cracking pressure of, say, 40 p.s.i., then the hydraulic valve can be held open even with the pressure dropping down to 10 p.s.i. once it has been opened. It is also possible to use a counter-balanced valve (FIG. 8) as is often used in hydraulics, in which case the spring-loaded check valve is readily adjustable.

This means that even with a 14:1 ratio the sound-source can be charged with only 150 p.s.i. and would still not "auto-pop".

This enables the sound-source to be sealed and reset on deck without fear of damaging the sound-source if it should go off accidentally. (At 2000 p.s.i. the sound-source will definitely get damaged if it goes off out of the water and this is, of course, very dangerous as well).

Amonst additional controls which could be provided is a spring detent holding device which is adjustable. This will have a similar effect as the previously mentioned pair of non-return valves, one of which is spring loaded but more difficult to adjust.

Another preferred addition to this hydraulic valve with pneumatic actuator is an adjustable orifice whereby the movement of the actuator can be slowed down to avoid too rapid opening of the hydraulic valve spool which could result in accelerating the sleeve too fast.

As has been indicated previously, the embodiment of FIGS. 1 to 4, whether or not modified in accordance with any of FIGS. 5 to 7 consumes much charging fluid. The embodiment of FIGS. 9 and 10 is intended to reduce the quantity of charging fluid required to reset the water sound-source.

Figure 9:
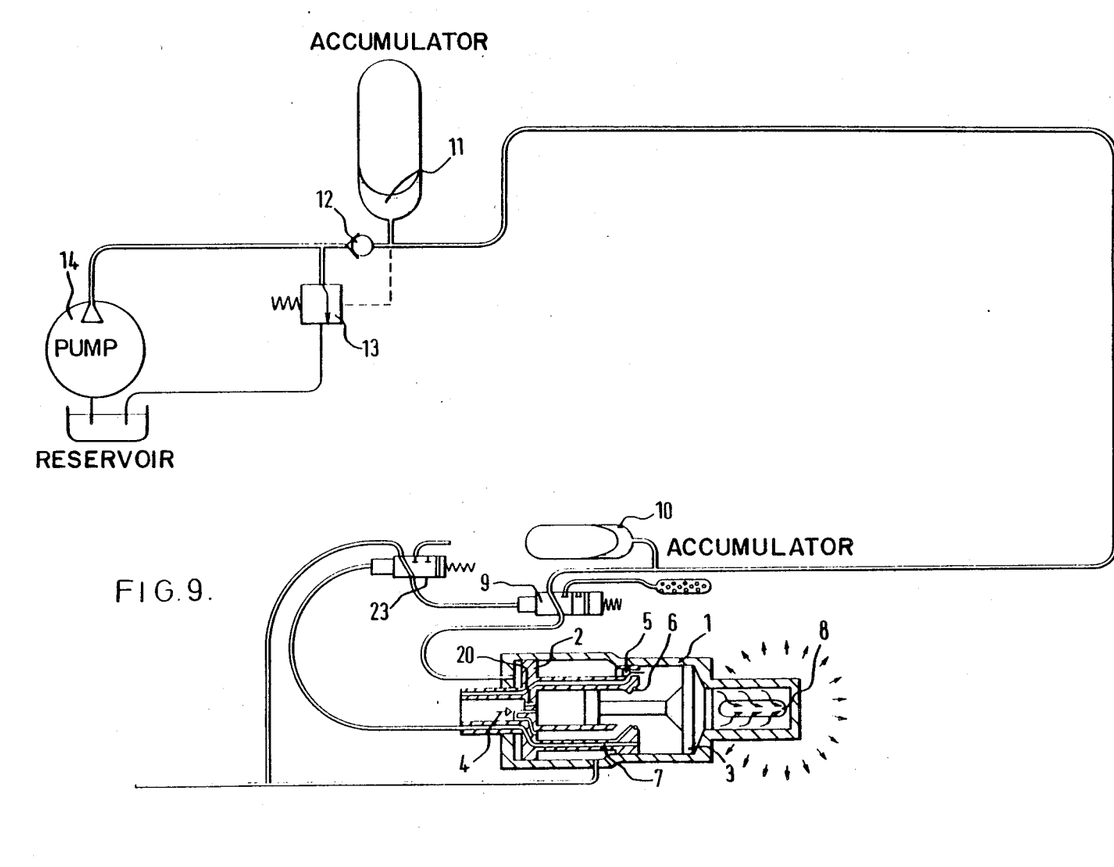
FIG. 9 is a schematic of a resetting system employing high pressure air as the valve actuating fluid.
Figure 10:
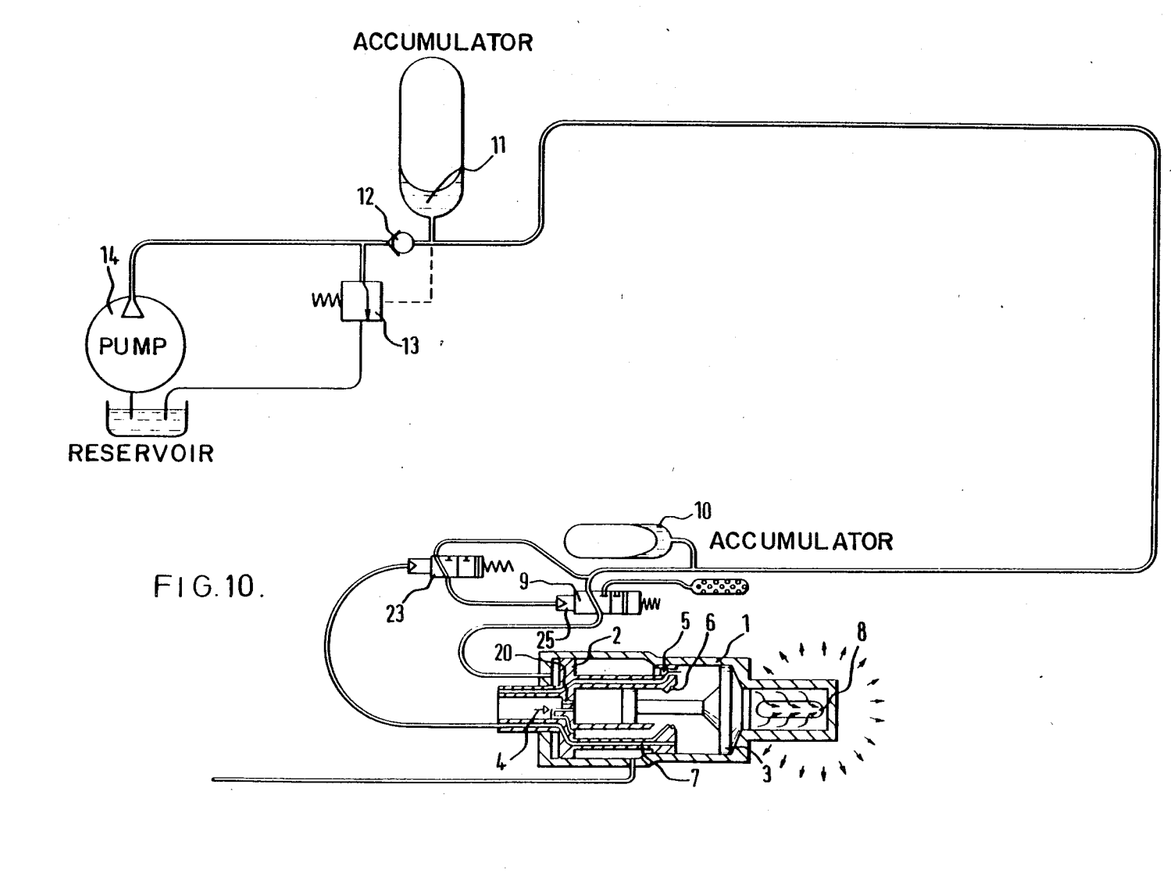
FIG. 10 is a schematic of a resetting system employing high pressure sea water as the valve actuating fluid.

Referring to FIGS. 9 and 10 of the drawings, a water sound-source 1 includes a shuttle 3 possessing various surfaces to which pressure can be applied and a sleeve 2 also having surfaces to which pressure can be applied and adapted to cooperate with the shuttle 3. The general working of the water sound-source will not be here described since it is similar to that of the embodiment described above.

A three way valve 9 is arranged, in a second position, to admit sea water under pressure into the sound-source and, in a first position to permit discharge of seawater from the sound-source. It should be understood that the valve 9 in this embodiment need not itself be the valve described in FIGS. 1 to 7 capable of withstanding over-pressure but can be a conventional three-way valve.

The high pressure air used to actuate valve 23 is derived from conduit 7 in sleeve 2 and is supplied to the valve 23 immediately after the sound-source has been fired.

In the embodiment of FIG. 9 the valve is actuated by high pressure air tapped off from the supply of high pressure air used as the charging fluid for the sound-source. Control of the flow of high pressure air to valve 9 is effected by means of an actuating valve means in the form of a three way valve 23. This valve 23, which is amaller than valve 9, is arranged to be actuated by high pressure air and is such that it will be actuated and remain in its actuated state under a pressure of greater than a relatively low predetermined pressure, e.g. 50 p.s.i., until the air pressure falls to less than said predetermined pressure, whereupon biassing spring means within the valve 23 return it to its initial position. This valve 23 is capable of coping with the high pressure air (considerably in excess of e.g. 50 p.s.i.) whilst remaining actuable at said predetermined relatively low pressure, i.e. can be a smaller version of the valve 9 of FIGS. 1 to 4.

By utilizing the valve 23 as a pilot valve for valve 9, rather than using it as the main valve 9 itself (as in the previous embodiments) considerably less high pressure air is consumed (e.g. only one tenth of that required by the systems of the previous embodiments). Valve 9 can be a conventional three way valve driven by a small high pressure actuator 24 upon one end thereof.

Because only small pneumatic actuators are now required, faster resetting can be achieved.

Referring now to FIG. 10 of the accompanying drawings, this shows a system in which valve 23 is used to direct not high pressure air but high pressure seawater to actuate the valve 9 via a hydraulic actuator 25 upon one end thereof. In other respects the arrangement is similar to that shown in FIG. 9. By comparison with the system of FIGS. 1 to 4, the system of FIG. 10 uses approximately 94% less high pressure air.

The modifications and variants which are disclosed in FIGS. 5 to 8 are generally applicable to the embodiments of FIGS. 9 and 10. Moreover it is to be understood that the invention may be constructed otherwise than has been particularly described. For example the main three way valve may be controlled by a pilot valve which is itself controlled by a pilot valve thus to reduce further the quantity of charging fluid used and to increase the advantage of the system. Likewise where it has been indicated that valve 5 detects when sleeve 2 and shuttle 3 come into contact, it is to be understood that any suitable sensing means may be employed for this purpose, such as proximity switch means, electromagnetic sensors, electric sensing means, etc.

By means of the present invention there is provided a sound-source and a resetting system therefor which can be simple, sturdy, less-energy consuming than known sound-sources and their resetting systems, pollution-free and of lower capital cost. The sound-source can also be rendered safer and protected from the phenomenon of "auto-popping". Moreover, it becomes possible to pre-charge the sound-source on the deck of a ship, at a relatively low pressure.

We claim:

1. A seismic water gun, including an automatic resetting apparatus, which apparatus includes a source of pressurized resetting liquid, conduit means for connecting said source of pressurized resetting liquid to a sound-source, a sound-source including means for expelling a slug of water to generate an impulse of sound in the water, a main valve in said conduit means, means for operating the main valve controllable by and acted upon by the pressure of a sound-source charging fluid, said operator means being actuable at a predetermined value of pressure within said charging fluid less than that of said resetting liquid to move a valve member from a first position to a second position and which valve member remains in said second position until the pressure within the charging fluid falls below said predetermined value, whereupon said valve member moves from said second position to return to said first position, said valve member including a first passage aligned when in said second position to allow said resetting liquid to pass along said conduit means to reset said sound-source, and said valve member including a second passage aligned when in said first position to allow a discharge of the resetting liquid from the sound-source after said sound-source as been reset.

2. A water gun according to claim 1, wherein said source of pressurized resetting liquid comprises a source of pressurized seawater.

3. A water gun according to claim 1, wherein said source of pressurized resetting liquid comprises a source of pressurized oil.

4. Apparatus according to claim 1, wherein said source of pressurized resetting liquid comprises a source of pressurized water based liquid.

5. A water gun according to claim 1, wherein said charging fluid comprises compressed air which is used to operate said sound-source for generating said impulse of sound.

6. A water gun according to claim 1, in which said valve includes a piston having a surface acted upon by said charging fluid to drive said piston, to move said valve member for controlling the flow of resetting liquid.

7. A water gun according to claim 6, including resilient biasing means for biasing said piston in opposition against a force exerted thereon by said charging fluid, said force being selected such that said valve member will move from said first position to said second position at said predetermined value of pressure of said charging fluid and will stay in said second position while the pressure of said charging fluid increases until the pressure of said charging fluid falls below the value for balancing the force biasing means.

8. A water gun according to claim 7, including stop means mounted in the path of said piston so that any over pressure exerted by said charging fluid above said predetermined low value acting upon said piston will not further move said valve member.

9. A water gun according to claim 1, wherein said valve operator means comprises a first pilot valve provided for controlling operation of said main valve, and a second pilot valve for controlling said first pilot valve, said second pilot valve adapted to be acted upon by actuating pressure of a said sound-source charging fluid.

10. A water gun according to claim 1, wherein at least one accumulator is provided in said conduit means for said pressurized resetting liquid.

11. A water gun according to claim 1, wherein control valve means is provided for preventing the pressure of said charging fluid applied to said main valve from falling until there has been achieved a sufficient pressure differential between a sound-source actuating pressure and the pressure acting upon the main valve.

12. A water gun according to claim 1, wherein bleed valve means is provided to prevent premature resetting of said sound-source.

13. A water gun according to claim 1, wherein means is provided for recycling the resetting liquid from said sound-source and said valve in the conduit means back to said source of pressurized resetting liquid.

* * * * *